UNITED STATES PATENT OFFICE.

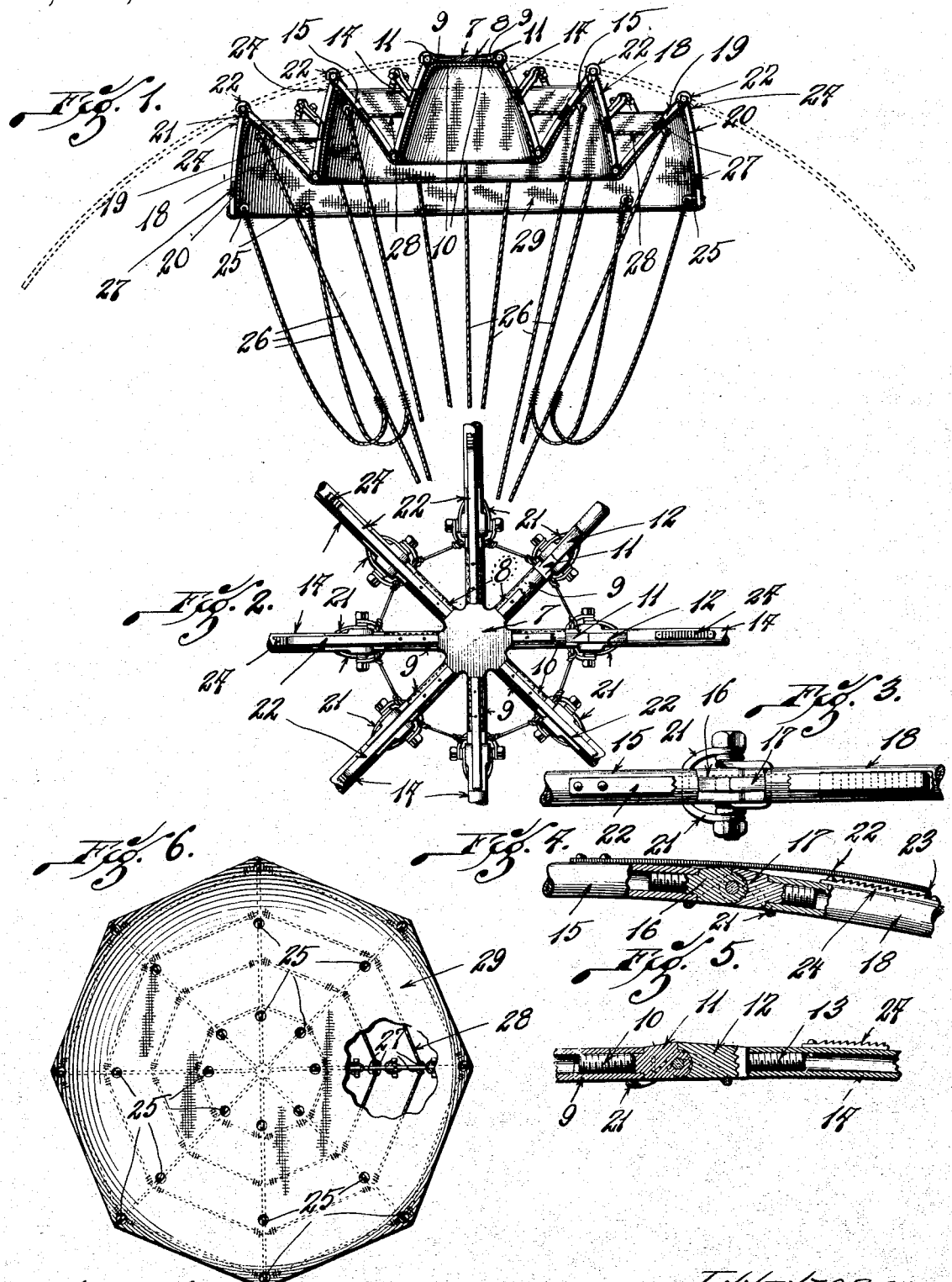

JOSEPH E. CHAMBERS, OF ST. LOUIS, MISSOURI.

PARACHUTE.

1,200,585.     Specification of Letters Patent.     Patented Oct. 10, 1916.

Application filed October 7, 1912. Serial No. 724,487.

*To all whom it may concern:*

Be it known that I, JOSEPH E. CHAMBERS, a citizen of the United States, and resident of St. Louis, Missouri, have invented certain new and useful Improvements in Parachutes, of which the following is a specification containing a full, clear, and exact description, reference being had to the accompanying drawings, forming a part hereof.

My invention relates to improvements in parachutes, and the object of my invention is to construct a parachute having a folding frame in order that there may be a maximum of supporting area which may be folded to occupy a minimum of space, and further to provide the folding frame with means for mechanically extending the parachute for use.

With the above purposes in view my invention consists in certain novel features of construction and arrangement of parts as will be hereinafter more fully described, pointed out in the claims and illustrated by the accompanying drawings, in which—

Figure 1 is a sectional elevation of my improved parachute in a partially folded condition; Fig. 2 is a plan showing the central portion of the parachute frame, the outer ends of the ribs of the frame being broken away; Fig. 3 is a detail plan illustrating one of the joints connecting two sections of a rib; Fig. 4 is an elevation partly in section of the joints shown in Fig. 3; Fig. 5 is a sectional elevation illustrating the joint which connects one of the ribs with the central portion of the frame; and Fig. 6 is an inverted plan of the parachute extended, a portion of the parachute cover being broken away.

Referring by numerals to the accompanying drawings: 7 designates the central plate of my improved parachute frame. Formed integral with the plate is a plurality of radial arms 8, and secured to each of said arms is a tube 9 the outer ends of which are internally screw threaded. Into each of the arms is threaded a stem 10 carrying the member 11 of a knuckle-joint. Pivotally secured to the member 11 is a member 12, having at its free end a screw threaded stem 13 arranged to receive a section 14 of one of my improved ribs which, as shown in Fig. 5, is tubular and internally threaded at each of its ends. Secured to the section 14 of each rib is a tubular section 15 which, like the section 14, is internally threaded at each of its ends. Connecting the sections 14 and 15 there are members 16 and 17 of a knuckle-joint. Each of the members 16 and 17 carries a threaded stem arranged to be secured in the threaded ends of said sections.

18, 19 and 20 designate ribs identically like the ribs 14 and 15 and are jointed by knuckle-members identically like the ones designated by 16 and 17. At each knuckle-joint there is a spring 21 which engages a pair of said ribs and normally tends to extend the ribs to parallel their sections.

Straddling each alternate joint between the sections of each of the ribs and secured to the sections is a leaf spring 22 bearing a hook or pawl 23 arranged to engage with a rack 24 carried by an adjacent rib section. These springs 22 and the racks 24 are for purpose of holding or locking the rib sections in an extended condition.

Carried by certain of the sections of each rib is a plurality of eyes 25 to provide a means for the attachment of suspending ropes or devices 26 to which the body to be lowered in the air by the parachute is secured.

27 designates loops carried by each section of each rib which are arranged for the securing to the ribs of ropes or flexible devices 28, which ropes or devices serve the double function of limiting or determining the radial separation of the rib sections, and also to provide a means for an attachment to the parachute frame of the flexible body or cover 29 which is secured to the ropes 28 by means of stitching.

The suspending ropes 26 are, of course, on the inside of the parachute body or cover and the ropes 28 are preferably located on the outside of the parachute body or cover. By this arrangement of the suspending ropes and by reason of their being attached at various points throughout the length of the ribs, the strain is thus equalized and hence an extremely light construction of rib may be employed and, for the reason that the parachute body or cover is reinforced between the ribs by the ropes 28, an extremely light body or cover may be used.

A parachute constructed according to my invention and as illustrated and described may be folded to occupy a minimum of space and, when folded, the sections of all of the ribs bear against extensile springs.

In order to hold the jointed ribs in a folded condition any suitable bond may be employed which encircles all of the sections and which, of course, must be cut or otherwise disconnected for the release of the parachute ribs. It will be obvious that, when the ribs are released by a severing or disconnecting of the bond referred to, the sections of the ribs will be mechanically extended, and the flexible body or cover mechanically moved to its operative condition.

By reason of the locking devices carried by the jointed sections of each rib, a collapse of the parachute is impossible, but by manual release of said locking devices the parachute may be refolded for future use.

I claim:

1. In a parachute, a frame comprising a plurality of ribs, each of which consists of a number of hinged sections spring-actuated in one direction and provided with means for limiting their movements, a flexible cover for the ribs, and means for locking the sections of each rib when the sections are approximately alined with each other.

2. In a parachute, a frame comprising a plurality of ribs, each of which consists of a number of hinged sections, means acting on said sections for mechanically moving them to approximate alinement, means for locking the sections in alinement, and a flexible folding parachute body carried by said ribs.

3. In a parachute, a frame comprising a plurality of radial ribs each rib comprising a plurality of hinged sections, spring actuated in one direction, and the hinges of each rib alternately arranged whereby the sections may fold in opposite directions, and means at each hinge for limiting its movement in a direction opposed to its folding movement, a flexible covering for all of the ribs and suspension devices connected with a plurality of the sections of each rib.

In testimony whereof, I have signed my name to this specification, in presence of two subscribing witnesses.

JOSEPH E. CHAMBERS.

Witnesses:
E. L. WALLACE,
N. G. BUTLER.